(12) United States Patent
Chirme et al.

(10) Patent No.: US 11,633,684 B2
(45) Date of Patent: *Apr. 25, 2023

(54) INTERLOCK FOR GENUINE FILTER RECOGNITION

(71) Applicant: CUMMINS FILTRATION IP, INC., Columbus, IN (US)

(72) Inventors: Sonal Laxman Chirme, Pune (IN); Erica C. Clark-Heinrich, Cookeville, TN (US); Matthew Louison, McFarland, WI (US); Ken Tofsland, Stoughton, WI (US); Mark V. Holzmann, Stoughton, WI (US); Terry W. Shults, Cookeville, TN (US); Scott W. Schwartz, Cottage Grove, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,103

(22) Filed: Nov. 29, 2021

(65) Prior Publication Data
US 2022/0080344 A1 Mar. 17, 2022

Related U.S. Application Data

(63) Continuation of application No. 16/639,320, filed as application No. PCT/US2018/048303 on Aug. 28, 2018, now Pat. No. 11,192,055.
(Continued)

(51) Int. Cl.
*B01D 35/143* (2006.01)
*B01D 46/52* (2006.01)
*B01D 46/00* (2022.01)

(52) U.S. Cl.
CPC ......... *B01D 46/009* (2013.01); *B01D 35/143* (2013.01); *B01D 46/521* (2013.01);
(Continued)

(58) Field of Classification Search
None
See application file for complete search history.

(56) References Cited

U.S. PATENT DOCUMENTS 3,794,848 A 2/1974 Peters et al.
5,382,784 A 1/1995 Eberhardt
(Continued)

FOREIGN PATENT DOCUMENTS

CN 1039188 A 1/1990
CN 1547824 11/2004
(Continued)

OTHER PUBLICATIONS

Foreign Action other than Search Report on CN 2018800544933 dated May 8, 2021.
(Continued)

*Primary Examiner* — Terry K Cecil
(74) *Attorney, Agent, or Firm* — Foley & Lardner LLP

(57) ABSTRACT

Various example embodiments relate to a filtration system and methods for the installation and use of such a filtration system. According to a set of embodiments, the filtration system comprises a housing that defines a central compartment therein. The filtration system further comprises a filter cartridge positioned within the central compartment of the housing. The filter cartridge comprises a filter media and an identification element. The filtration system further comprises a sensor. The sensor is structured to sense the identification element of the filter cartridge. The filtration system further comprises a filter blocking mechanism communicably coupled to the sensor. The filter blocking mechanism is
(Continued)

structured prevent installation of the filter cartridge into the housing unless filter cartridge information of the identification element sensed by the sensor is identified as corresponding to an authorized filter cartridge.

18 Claims, 9 Drawing Sheets

Related U.S. Application Data

(60) Provisional application No. 62/552,242, filed on Aug. 30, 2017.

(52) U.S. Cl.
CPC ............... *B01D 2201/304* (2013.01); *B01D 2201/4046* (2013.01); *B01D 2201/52* (2013.01)

(56) References Cited

U.S. PATENT DOCUMENTS

| | | | |
|---|---|---|---|
| 6,040,773 A | 3/2000 | Vega et al. | |
| 6,218,942 B1 | 4/2001 | Vega et al. | |
| 6,252,508 B1 | 6/2001 | Vega et al. | |
| 6,496,112 B1 | 12/2002 | Vega | |
| 6,898,489 B1 | 5/2005 | Hayes, Sr. | |
| 6,982,653 B2 | 1/2006 | Voeller et al. | |
| 7,042,346 B2 | 5/2006 | Paulsen | |
| 7,173,515 B2 | 2/2007 | Ohki et al. | |
| 7,177,553 B2 | 2/2007 | Ono | |
| 7,212,118 B1 | 5/2007 | Wojciechowski et al. | |
| 7,227,721 B1 | 6/2007 | Kientz et al. | |
| 7,265,675 B1 | 9/2007 | Carrender et al. | |
| 7,307,533 B2 | 12/2007 | Ishii | |
| 7,400,268 B2 | 7/2008 | Wilbrink et al. | |
| 7,561,022 B2 | 7/2009 | Bosco et al. | |
| 7,768,401 B2 | 8/2010 | Nagai et al. | |
| 7,902,985 B2 | 3/2011 | Rice et al. | |
| 7,932,826 B2 | 4/2011 | Fritchie et al. | |
| 8,057,669 B2 | 11/2011 | Beard et al. | |
| 8,242,893 B1 | 8/2012 | Lin | |
| 8,305,194 B2 | 11/2012 | Noel et al. | |
| 8,397,920 B2 | 3/2013 | Moy et al. | |
| 8,449,765 B2 | 5/2013 | Kreibig et al. | |
| 8,673,137 B2 | 3/2014 | Verdegan et al. | |
| 8,830,031 B2 | 9/2014 | Komine et al. | |
| 8,872,632 B2 | 10/2014 | Noel et al. | |
| 9,002,534 B2 | 4/2015 | Grasso et al. | |
| 9,072,992 B2 | 7/2015 | Mendel et al. | |
| 10,874,959 B2 | 12/2020 | Boden et al. | |
| 11,192,055 B2 * | 12/2021 | Chirme | B01D 17/02 |
| 2002/0174770 A1 | 11/2002 | Badeau et al. | |
| 2004/0046999 A1 | 3/2004 | Watanabe et al. | |
| 2006/0060512 A1 | 3/2006 | Astle et al. | |
| 2006/0075315 A1 | 4/2006 | Cruz et al. | |
| 2007/0013733 A1 | 1/2007 | Katsurai et al. | |
| 2007/0018830 A1 | 1/2007 | Inoue et al. | |
| 2007/0035644 A1 | 2/2007 | Kuo et al. | |
| 2007/0052973 A1 | 3/2007 | Yamaguchi | |
| 2007/0096881 A1 | 5/2007 | Pillai | |
| 2007/0262869 A1 | 11/2007 | Young et al. | |
| 2007/0272758 A1 | 11/2007 | Kulkarni et al. | |
| 2008/0150747 A1 | 6/2008 | Eren et al. | |
| 2009/0005504 A1 | 1/2009 | Schneider et al. | |
| 2009/0008861 A1 | 1/2009 | Kasahara et al. | |
| 2009/0045106 A1 | 2/2009 | Kuennen et al. | |
| 2009/0085738 A1 | 4/2009 | Darianian et al. | |
| 2009/0146809 A1 | 6/2009 | Kientz | |
| 2009/0239307 A1 | 9/2009 | Dileo | |
| 2010/0007501 A1 | 1/2010 | Yang et al. | |
| 2010/0102933 A1 | 4/2010 | Hsieh et al. | |
| 2010/0161895 A1 | 6/2010 | Qualls et al. | |
| 2010/0193589 A1 | 8/2010 | Jackson et al. | |
| 2011/0075214 A1 | 3/2011 | Murayama | |
| 2011/0113736 A1 | 5/2011 | Raether et al. | |
| 2011/0156909 A1 | 6/2011 | Rice et al. | |
| 2011/0186634 A1 | 8/2011 | Jackson et al. | |
| 2012/0079322 A1 | 3/2012 | Gupta et al. | |
| 2012/0079798 A1 | 4/2012 | Rafi et al. | |
| 2012/0146772 A1 | 6/2012 | Eren et al. | |
| 2012/0206241 A1 | 8/2012 | Rice et al. | |
| 2013/0180898 A1 | 7/2013 | Chajec et al. | |
| 2013/0220900 A1 | 8/2013 | Milvert et al. | |
| 2014/0267728 A1 | 9/2014 | Dahlin | |
| 2015/0101669 A1 | 4/2015 | Krause et al. | |
| 2015/0143830 A1 | 5/2015 | Krause et al. | |
| 2015/0290569 A1 | 10/2015 | Chernov et al. | |
| 2016/0144310 A1 | 5/2016 | Movia et al. | |
| 2017/0056794 A1 | 3/2017 | Chernov et al. | |
| 2017/0065910 A1 | 3/2017 | Chernov et al. | |
| 2017/0080363 A1 | 3/2017 | Krause et al. | |

FOREIGN PATENT DOCUMENTS

| | | |
|---|---|---|
| CN | 1993164 | 7/2007 |
| CN | 101356543 A | 1/2009 |
| CN | 102770667 A | 11/2012 |
| CN | 203561995 U | 4/2014 |
| CN | 104144732 | 11/2014 |
| CN | 104636788 A | 5/2015 |
| CN | 204419425 U | 6/2015 |
| CN | 204480274 U | 7/2015 |
| CN | 204595905 U | 8/2015 |
| CN | 104899530 A | 9/2015 |
| CN | 103093162 A | 1/2016 |
| CN | 105775664 A | 7/2016 |
| CN | 205773434 U | 12/2016 |
| CN | 205882694 U | 1/2017 |
| CN | 206075315 U | 4/2017 |
| CN | 106663517 | 5/2017 |
| CN | 106925025 | 7/2017 |
| DE | 20 2005 012 407 U1 | 3/2006 |
| DE | 20 2006 010 764 U1 | 11/2006 |
| DE | 10 2006 029 105 A1 | 12/2006 |
| DE | 10 2009 041 671 A1 | 3/2011 |
| EP | 1 239 479 A1 | 9/2002 |
| EP | 1 398 725 A2 | 3/2004 |
| EP | 1 580 678 A2 | 9/2005 |
| EP | 1 684 215 A2 | 7/2006 |
| EP | 1 862 946 A1 | 12/2007 |
| EP | 1 973 299 A1 | 9/2008 |
| EP | 1 985 351 A1 | 10/2008 |
| EP | 1 986 356 A2 | 10/2008 |
| EP | 2 011 097 A2 | 1/2009 |
| EP | 2 058 955 A1 | 5/2009 |
| EP | 2 092 593 A4 | 7/2011 |
| EP | 2 698 339 A1 | 2/2014 |
| EP | 2 778 713 A1 | 9/2014 |
| JP | 2005-259760 A | 9/2005 |
| JP | 2006-228411 A | 8/2006 |
| JP | 2007-125523 | 5/2007 |
| JP | 4135730 B2 | 8/2008 |
| JP | 4153918 B2 | 9/2008 |
| JP | 4161905 B2 | 10/2008 |
| JP | 2009-069934 A | 4/2009 |
| JP | 4255975 B2 | 4/2009 |
| JP | 2009-116907 A | 5/2009 |
| JP | 4284193 B2 | 6/2009 |
| JP | 4295579 B2 | 7/2009 |
| JP | 4324164 B2 | 9/2009 |
| JP | 2010-048525 A | 3/2010 |
| JP | 4473084 B2 | 6/2010 |
| JP | 4563175 B2 | 10/2010 |
| JP | 2010-264403 A | 11/2010 |
| JP | 2010-287077 A | 12/2010 |
| JP | 2011-064872 A | 3/2011 |
| JP | 2011-100504 A | 5/2011 |
| JP | 4691639 B2 | 6/2011 |
| JP | 5023868 B2 | 9/2012 |
| JP | 10-000008 | 9/2014 |
| JP | 3194396 U | 11/2014 |
| JP | 5662409 B2 | 1/2015 |
| KR | 102005058233 A | 6/2005 |
| KR | 100567842 B1 | 3/2006 |

(56) References Cited

FOREIGN PATENT DOCUMENTS

| | | |
|---|---|---|
| KR | 100571964 B1 | 4/2006 |
| KR | 102006092541 A | 8/2006 |
| KR | 100686597 B1 | 2/2007 |
| KR | 100706307 B1 | 4/2007 |
| KR | 100722168 B1 | 5/2007 |
| KR | 100666338 B1 | 9/2007 |
| KR | 100769295 B1 | 10/2007 |
| KR | 102007099948 B1 | 10/2007 |
| KR | 102007100508 A | 10/2007 |
| KR | 100778306 B1 | 11/2007 |
| KR | 100778307 B1 | 11/2007 |
| KR | 100783084 B1 | 11/2007 |
| KR | 100801904 B1 | 1/2008 |
| KR | 102008012998 A | 2/2008 |
| KR | 102008018586 A | 2/2008 |
| KR | 102008042578 A | 5/2008 |
| KR | 100841647 B1 | 6/2008 |
| KR | 102008067855 A | 7/2008 |
| KR | 100874732 B1 | 12/2008 |
| KR | 102008113081 A | 12/2008 |
| KR | 100915542 B1 | 8/2009 |
| KR | 100939350 B1 | 1/2010 |
| KR | 100954581 B1 | 4/2010 |
| KR | 100967787 B1 | 6/2010 |
| KR | 102010081531 A | 7/2010 |
| KR | 102010094616 A | 8/2010 |
| KR | 102011075491 A | 7/2011 |
| KR | 102012056591 A | 6/2012 |
| KR | 101198118 B1 | 10/2012 |
| KR | 101227154 B1 | 1/2013 |
| KR | 102013039158 A | 4/2013 |
| KR | 102015124705 A | 11/2015 |
| WO | WO-99/44177 A1 | 9/1999 |
| WO | WO-00/52498 A1 | 9/2000 |
| WO | WO-03/013864 | 2/2003 |
| WO | WO-2004/032026 A1 | 4/2004 |
| WO | WO-2004/046999 A2 | 6/2004 |
| WO | WO-2005/029721 A1 | 3/2005 |
| WO | WO-2005/052847 A1 | 6/2005 |
| WO | WO-2005/072137 A2 | 8/2005 |
| WO | WO-2006/060781 A1 | 6/2006 |
| WO | WO-2006/091765 A2 | 8/2006 |
| WO | WO-2006/101785 A2 | 9/2006 |
| WO | WO-2007/027220 A2 | 3/2007 |
| WO | WO-2007/031852 A1 | 3/2007 |
| WO | WO-2007/035644 A2 | 3/2007 |
| WO | WO-2007/052973 A1 | 5/2007 |
| WO | WO-2008/024531 A2 | 2/2008 |
| WO | WO-2008/060012 A1 | 5/2008 |
| WO | WO-2008/079556 A2 | 7/2008 |
| WO | WO-2008/088124 A1 | 7/2008 |
| WO | WO-2008/090307 A2 | 7/2008 |
| WO | WO-2008/090539 A2 | 7/2008 |
| WO | WO-2008/111435 A1 | 9/2008 |
| WO | WO-2008/146379 A1 | 12/2008 |
| WO | WO-2009/005504 A1 | 1/2009 |
| WO | WO-2009/008861 A1 | 1/2009 |
| WO | WO-2009/050980 A1 | 4/2009 |
| WO | WO-2009/064566 A1 | 5/2009 |
| WO | WO-2009/082620 A1 | 7/2009 |
| WO | WO-2009/111070 A1 | 9/2009 |
| WO | WO-2009/149746 A1 | 12/2009 |
| WO | WO-2010/024968 A1 | 3/2010 |
| WO | WO-2010/059818 A1 | 5/2010 |
| WO | WO-2010/068716 A1 | 6/2010 |
| WO | WO-2010/130611 A1 | 11/2010 |
| WO | WO-2011/022564 A2 | 2/2011 |
| WO | WO-2011/140724 A1 | 11/2011 |
| WO | WO-2012/013005 A2 | 2/2012 |
| WO | WO-2012/079322 A1 | 6/2012 |
| WO | WO-2012/092100 A1 | 7/2012 |
| WO | WO-2012/094825 A1 | 7/2012 |
| WO | WO-2012/116408 A1 | 9/2012 |
| WO | WO-2013/008886 A1 | 1/2013 |
| WO | WO-2013/074258 A1 | 5/2013 |
| WO | WO-2014/172083 A1 | 10/2014 |
| WO | WO-2015/102131 A1 | 7/2015 |
| WO | WO-2015/176479 A1 | 11/2015 |
| WO | WO-2015/176514 A1 | 11/2015 |
| WO | WO-2017/019428 A1 | 2/2017 |
| WO | WO-2017/051013 | 3/2017 |

OTHER PUBLICATIONS

International Search Report and Written Opinion for PCT App. No. PCT/US2017/041549, dated Dec. 5, 2017, 12 pages.
International Search Report and Written Opinion for PCT App. No. PCT/US2018/048303, dated Oct. 26, 2018, 9 pages.

\* cited by examiner

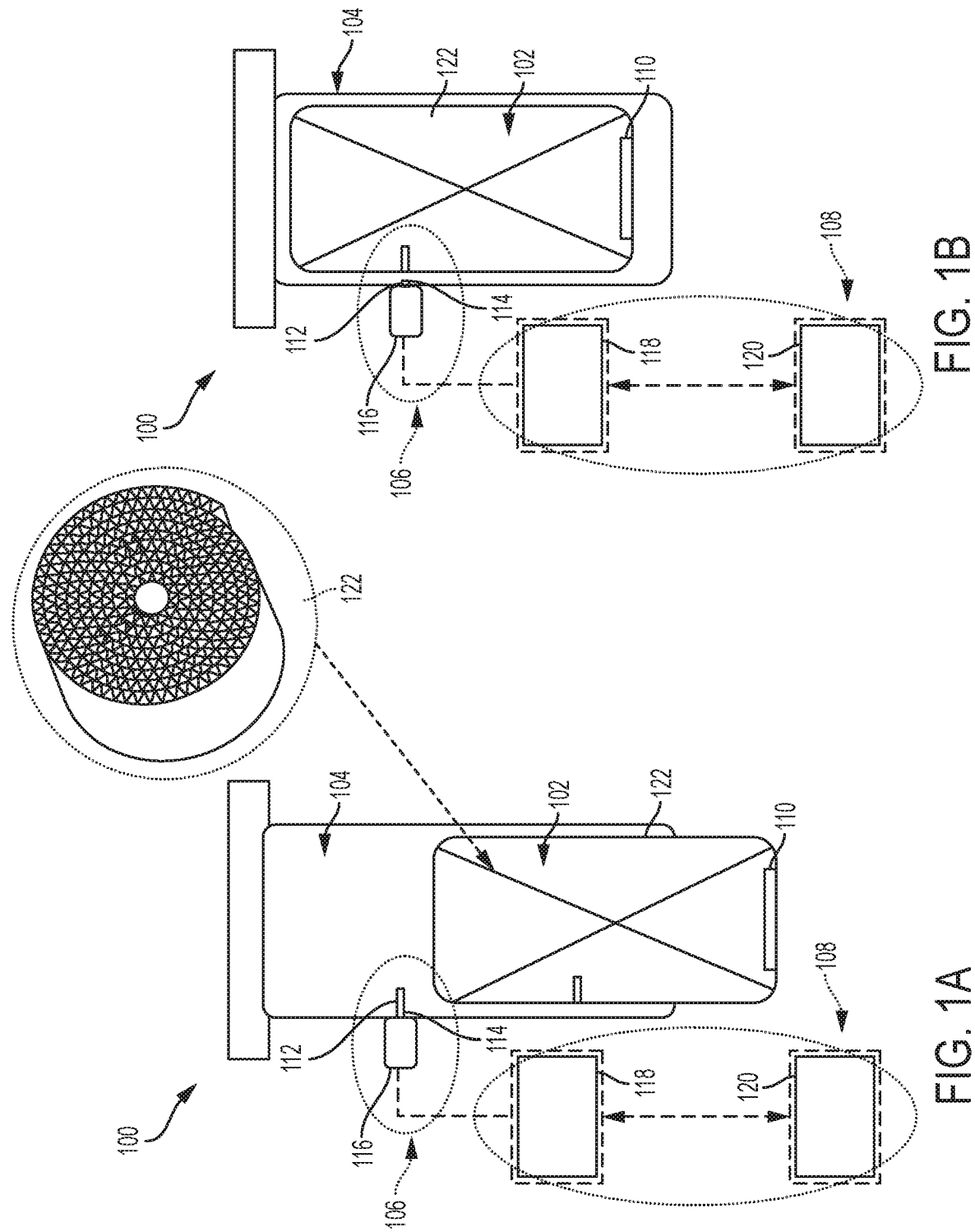

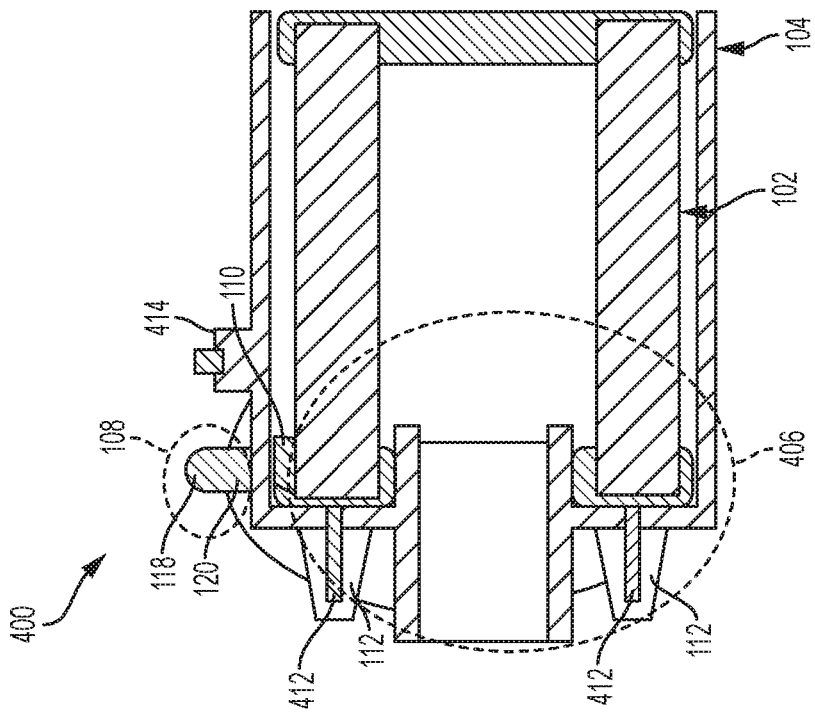
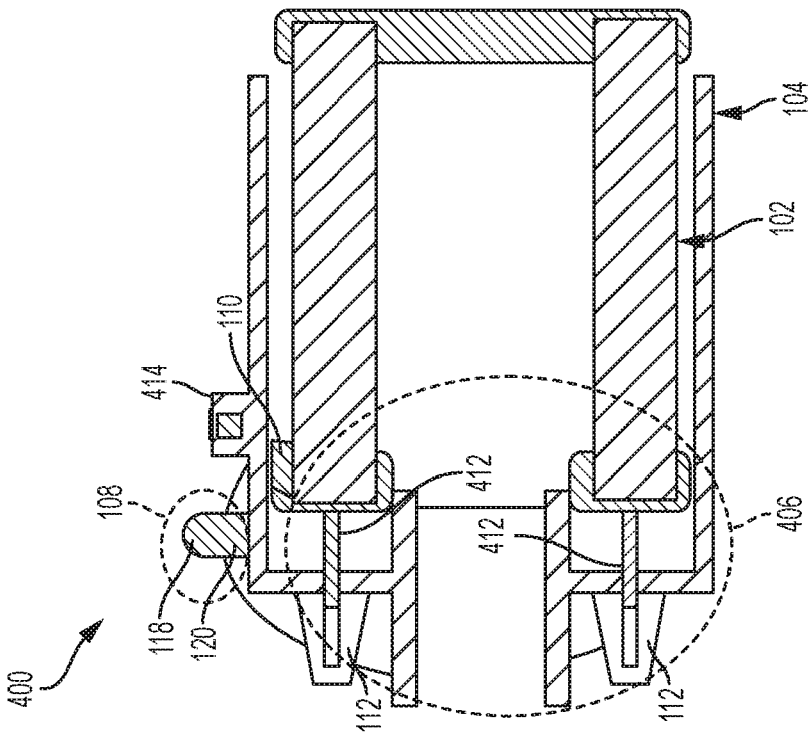
FIG. 4B
FIG. 4A

INTERLOCK FOR GENUINE FILTER RECOGNITION

CROSS-REFERENCE TO RELATED PATENT APPLICATION

The present application is a continuation of U.S. patent application Ser. No. 16/639,320, filed Feb. 14, 2020, which is a U.S. National Phase of PCT Application No. PCT/US2018/048303, filed Aug. 28, 2018, which claims the benefit of priority to U.S. Provisional Patent Application No. 62/552,242, filed Aug. 30, 2017, the contents of which are incorporated herein by reference in their entireties.

TECHNICAL FIELD

The present application relates to filtration systems.

BACKGROUND

Internal combustion engines generally combust a mixture of fuel (e.g., gasoline, diesel, natural gas, etc.) and air. Prior to entering the engine, fluids such as fuel, oil, and air are typically passed through filter cartridges to remove contaminants (e.g., particulates, dust, water, etc.) from the fluids prior to delivery to the engine. The filter cartridges (e.g., filter elements) require periodic replacement as the filter media of the filter cartridges captures and removes the contaminants from the fluids passing through the filter media. In some cases, unauthorized or non-genuine replacement filter cartridges may be installed in the filtration systems during servicing operations. The unauthorized and non-genuine replacement filter cartridges may be of inferior quality to genuine, authorized filter cartridges. Thus, the use of unauthorized or non-genuine replacement filter cartridges may cause damage to the engine by allowing contaminants past the filter cartridges.

Filter cartridges often include a seal member that is compressed against a component of the filtration system housing or another portion of the filtration system. The seal member forms a seal between the filtration system housing and the filter cartridge, thereby preventing fluid from bypassing the filter cartridges (e.g., for air to bypass an air filter cartridge or liquid to bypass a liquid filter cartridge). If an improper filter cartridge (i.e., a non-authorized or non-genuine filter cartridge) is installed in a filtration system, or if the proper filter cartridge is installed incorrectly, the seal member of the filter cartridge may not form a proper seal, and fluid may bypass the filter cartridge causing damage to downstream components. Accordingly, the installation of an improper filter cartridge can harm critical components in the filtration system, cause improper sealing, diminish emission compliance mechanisms, cause subpar performance, and the like.

SUMMARY

Various example embodiments relate to a filtration system and methods for the installation and use of such a filtration system. According to a set of embodiments, a filtration system comprises a housing that defines a central compartment therein. The filtration system further comprises a filter cartridge positioned within the central compartment of the housing. The filter cartridge comprises a filter media and an identification element. The filtration system further comprises a sensor. The sensor is structured to sense the identification element of the filter cartridge. The filtration system further comprises a filter blocking mechanism communicably coupled to the sensor. The filter blocking mechanism is structured prevent installation of the filter cartridge into the housing unless filter cartridge information of the identification element sensed by the sensor is identified as corresponding to an authorized filter cartridge.

Another example embodiments relates to a housing that defines a central compartment therein. The central compartment is configured to receive a filter element that includes an identification element. The housing further comprises a sensor. The sensor is structured to sense the identification element of the filter cartridge. The housing further comprises a filter blocking mechanism communicably coupled to the sensor. The filter blocking mechanism is structured prevent installation of the filter element into the housing unless filter element information of the identification element sensed by the sensor is identified as corresponding to an authorized filter element.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 1A shows a cross-sectional side view of a filtration system in a first position, according to an example embodiment.

FIG. 1B shows a cross-sectional side view of the filtration system of FIG. 1A in a second position.

FIG. 4A shows a cross-sectional side view of a filtration system in a first position, according to a further example embodiment.

FIG. 4B shows a cross-sectional side view of the filtration system of FIG. 3A in a second position.

DETAILED DESCRIPTION

Figure 1C:
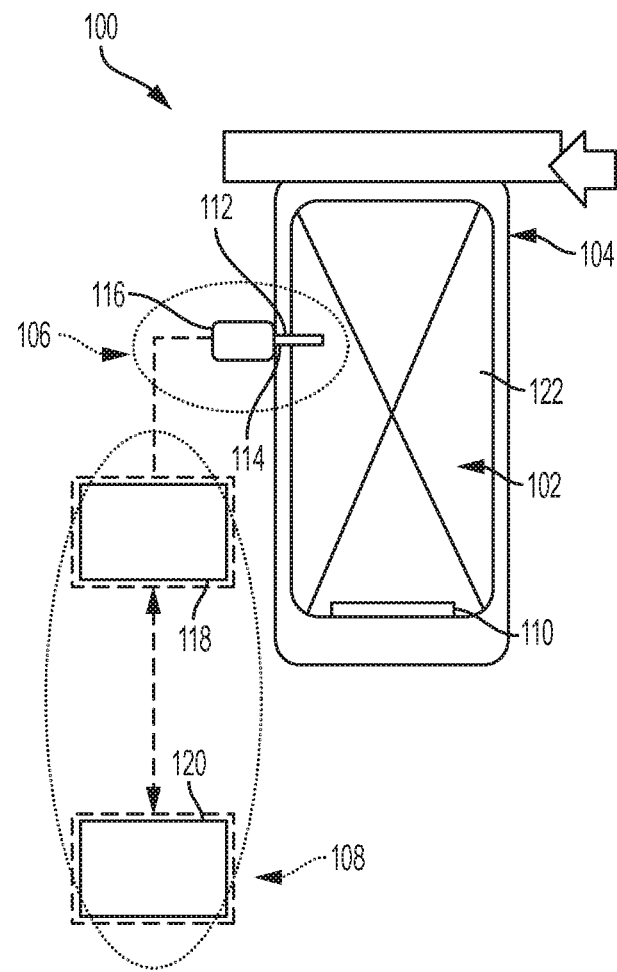
FIG. 1C shows a cross-sectional side view of the filtration system of FIG. 1A in a third position.

Referring to the figures generally, filtration systems and methods are described. Generally, the filtration system monitors whether a genuine (i.e., authorized, Original Equipment Manufacturer ("OEM") approved, etc.) or unauthorized filter cartridge is in the process of being installed in a given filtration system. The filtration system blocks the installation of unauthorized filter cartridges via a filter blocking mechanism (e.g., interlock). Monitored filtration systems and fluids may include any of fuel-water separator filtration systems, fuel filtration systems, lube filtration systems, hydraulic fluid filtration systems, air filtration systems, crankcase ventilation breather systems, engine oil, coolant fluid, hydraulic fluid, air and any other filtration systems or fluids relating to the operation of the internal combustion engine or vehicle. The filtration system may be retrofitted into an existing internal combustion engine or installed into a filtration system that does not already have a genuine filter cartridge recognition system. In some embodiments, the filtration system is integrated with a filtration monitoring system that monitors the health and status of the filtration system(s) present. The filtration monitoring system can, for example, track filter loading patterns, predict remaining service life of the filter, and utilize smart algorithms based on sensor feedback (e.g., pressure sensor feedback, fluid quality characteristic sensor feedback, etc.) to provide other filter information and assessments.

In some embodiments, the filtration system provides feedback as to whether a genuine or unauthorized filter cartridge is in the process of being installed in a given filtration system through an electronic identification system operably connected to a mechanical filter blocking feature installed on a housing. The authorized filter cartridge determination may be based on radio frequency identification ("RFID") technology. For example, each authorized filter cartridge may be assembled with an RFID tag, which is programmed with a unique code. As used herein, "authorized filter cartridge" refers to a filter cartridge that has been deemed acceptable for use in the associated filtration system. Reasons for deeming a filter cartridge to be considered an "authorized filter cartridge" may include, for example, the filter cartridge being compatible with the associated filtration system, the filter cartridge possessing design and quality specifications which satisfy requirements set by the manufacturer of the filtration system and/or a vehicle within which the filtration system is located, the filter cartridge having been manufactured by a manufacturer approved or certified by the manufacturer of the filtration system and/or a vehicle within which the filtration system is located, the filter cartridge meeting certain standards or guidelines set by a governmental organization or a standard-setting industry body, the filter cartridge being not being identified as having been stolen or misappropriated, the filter cartridge having not been previously installed in another vehicle or system, the filter cartridge being deemed acceptable or permissible for use in the geographical location where the filtration system is located, and/or other reasons.

The electronic identification system may include an RFID reader with an antenna that is structured to detect and read RFID tag information. In some embodiments, the RFID reader is structured to detect an RFID tag and determine a "level" (e.g., type, life cycle, size, etc.) of the associated filter cartridge. The filtration system analyzes the detected information (or absence thereof) to determine if a genuine (i.e., authorized, OEM approved, etc.) filter cartridge is being installed and, if it is genuine, to release the filter blocking feature to allow for complete installation.

Referring to FIG. 1A, a cross-sectional side view of a filtration system 100 in a first position is shown, according to an example embodiment. The filtration system 100 includes a filter cartridge 102, a housing 104, a filter blocking mechanism 106, and an electronic identification sensor 108. As shown in FIG. 1A, the filter cartridge 102 is in the process of being installed into the housing 104. The filtration system 100 is in a first position that includes the filter blocking mechanism 106 at rest. As will be appreciated, in the first position, the filter blocking mechanism 106 is in a blocking position (e.g., extended, rigidly positioned, etc.) and prevents the installation of any filter cartridge 102.

The filter blocking mechanism 106 will retract (or become capable of being transposed) only when the electronic identification sensor 108 identifies a genuine or authorized filter cartridge 102.

The filter cartridge 102 includes an identification element, for example in the form of an RFID tag 110, and filter media 122. The RFID tag 110 is recognizable by the electronic identification sensor 108 if the filter cartridge 102 is genuine and authorized for installation within the housing 104. The RFID tag 110 may be a passive (e.g., requires no internal power source) or an active (e.g., require an internal power source) RFID tag 110. In some arrangements, the RFID tag 110 is annular and substantially surrounds or encompasses an end of the filter cartridge 102. In other embodiments, the RFID tag 110 is disposed within the filter cartridge 102 and within an RFID range (e.g., distance that is detectable by an RFID reader). In one embodiment, the passive RFID transponder is embedded within the filter cartridge 102 or formed as a part of the filter cartridge 102. As will be appreciated, the RFID tag 110 may be located anywhere on the filter cartridge 102 that is within the RFID range of the electronic identification sensor 108. The RFID tag 110 can include other identification mechanisms such as a Quick Response ("QR") code, a barcode, a serial number, a model number, a fleet number, or another feature that identifies the filter cartridge 102 as being genuine or authorized for installation into the housing 104.

Although the filter media 122 is shown arranged as a cylindrical filter block having a circular cross-sectional shape, the filter media 122 can be arranged in other shapes (e.g., racetrack, elliptical, oval or other non-cylindrical shapes). The filter media 122 may comprise, for example, pleated filter media 122 arranged in a panel or pleat block, corrugated filter media (often referred to as pleated filter media 122) that is arranged in one or more panels, a block, a cylinder, or the like, other arrangements.

In one set of embodiments, the filter media 122 is generally formed by a flat sheet of filter media 122 and a formed sheet of filter media 122. The formed sheet includes a plurality of crests formed by a curves and/or pleats in the sheet. The plurality of crests form tetrahedron channels between the formed sheet and the flat sheet. Embossments, such as dimples, are provided on the crests formed by the curves and/or pleats. The embossments help to maintain spacing between adjacent layers of the filter media (i.e., between the formed sheet and the flat sheet), thereby increasing dust holding capacity and lowering pressure drop over similarly structured filter media not having the embossments. In some arrangements, the filter media 122 is pleated along a plurality of bend lines. The bend lines extend axially along an axial direction and include a first set of bend lines extending from the upstream inlet axially towards the downstream outlet, and a second set of bend lines extending from the downstream outlet axially towards the upstream inlet.

In some arrangements, the filter media 122 includes a plurality of inlet tetrahedron flow channels and a plurality of outlet tetrahedron flow channels. The inlet tetrahedron merge in a central portion of the filter material, thereby allowing axial cross-flow of air between the inlet tetrahedron channels prior to the air passing through the filter media. Such an arrangement provides for additional dust loading on the upstream side of the media, which increases filter capacity. Specific arrangements of such tetrahedral filter media are further described in U.S. Pat. No. 8,397,920. In an alternate arrangement, the flow channels comprise flutes that are alternately sealed at the upstream and downstream ends.

The housing 104 includes a central compartment and the filter blocking mechanism 106. The central compartment is structured to receive the filter cartridge 102. Although the housing 104 is shown arranged as a cylindrical housing having a circular cross-sectional shape, the housing 104 can be arranged in other shapes to receive the filter cartridge 102. The filter blocking mechanism 106 is structured to block installation of a filter cartridge into the central compartment of the housing 104 until a genuine filter cartridge 102 is detected. In some embodiments, the filter blocking mechanism 106 is embedded within the housing 104 or formed as a part of the housing 104. In other embodiments, the filter blocking mechanism 106 is removably coupled to the housing 104. In either embodiments, the filter blocking mechanism 106 has a protrusion that prevents the installation of unauthorized, non-genuine filter cartridge.

The filter blocking mechanism 106 comprises a mechanical locking mechanism that is operably connected to the electronic identification sensor 108. The filter blocking mechanism 106 includes a plunger 112, a biasing member (e.g., coil spring) 114, and a solenoid 116. The solenoid 116 includes an electromechanically operated valve that is activated by an electric current that runs through the solenoid 116. The biasing member 114 may be in the form of a coil spring or other type of spring. In the first position (e.g., at rest), the biasing member 114 biases the plunger 112 into a locked position and the solenoid 116 has no current. While in the first position, the filter blocking mechanism 106 is extended and locked (e.g., in a blocking positon) by way of the biasing member 114 biasing the plunger 112 to extend into the central compartment of the housing 104. As shown in FIG. 1A, the plunger 112 extends in a direction that is substantially perpendicular to the central axis of the central cavity of the housing 104. As will be appreciated, when the solenoid 116 is at rest, and has no current, the biasing member 114 prevents the plunger 112 from retracting, thereby preventing installation of any filter cartridge 102.

The electronic identification sensor 108 is operably connected to the filter blocking mechanism 106. The electronic identification sensor 108 includes an RFID reader 118 communicatively coupled to an RFID antenna 120. In some embodiments, the electronic identification sensor 108 is embedded within the housing 104 or formed as a part of the housing 104. In other embodiments, the electronic identification sensor 108 is removably coupled to the housing 104. In some embodiments, the electronic identification sensor 108 is disposed on an end of the housing 104 that is adjacent to location of the RFID tag 110 of a properly installed genuine filter cartridge 102. In other embodiments, the electronic identification sensor 108 is located within the filtration system 100 but is not attached to the housing 104 or filter cartridge 102. As will be appreciated, the electronic identification sensor 108 is generally located at a location on the housing 104 that is within the range to detect an RFID tag 110 on a genuine filter cartridge 102 being installed into the central compartment of the housing 104.

The RFID reader 118 comprises an RFID receiver or transceiver that is structured to read identification data contained on the RFID tag 110 of the filter cartridge. The identification data may include at least a serial number or unique code associated with the filter cartridge 102 that is trying to be installed. The serial number or unique code indicates whether the filter cartridge 102 is genuine or authorized. The RFID reader 118 includes a RFID antenna 120 that communicates with the RFID tag 110 by sending and receiving signals. The RFID antenna 120 is structured to communicate within an RFID range to detect an RFID tag 110 on a genuine filter cartridge 102 as the filter cartridge 102 is attempting to be installed. In some embodiments, the RFID range is sufficient to allow for the RFID reader 118 to detect the RFID tag 110—thereby causing the filter blocking mechanism 106 to retract or become movable—before the genuine filter cartridge 102 comes in contact with the plunger 112. In some arrangements, the RFID reader 118 includes a processor communicably coupled to the RFID reader 118 and RFID antenna 120. The processor is structured to interrogate RFID tags embedded in filtration cartridges installed in a monitored filtration system to determine if the installed filtration cartridge is genuine.

As shown in FIG. 1A, the genuine filter cartridge 102 is in the process of being installed into the housing 104. The RFID reader 118 transmits a query via the RFID antenna 120 within the RFID range. The RFID tag 110 is within the RFID range and receives the query, and sends identification data back to the RFID reader 118 in response. The RFID reader 118 determines that the RFID tag 110 is associated with a genuine or authorized filter cartridge 102. In response to the RFID reader 118 determining that the RFID tag 110 is associated with a genuine or authorized filter cartridge 102, the electronic identification sensor 108 causes the solenoid 116 of the filter blocking mechanism 106 to become energized. When the solenoid 116 is energized, the biasing member 114 no longer biases the plunger 112 and the plunger 112 is retracted—as shown in FIG. 1B—thereby allowing for the installation of the filter cartridge 102 as it is fully disposed in the central compartment of the housing 104. In one embodiment, the plunger 112 comprises a moving ferrous core (e.g., a piston) disposed inside a wire coil. At rest, the piston is held outside of the wire coil by the biasing member 114 (e.g., a spring). When a voltage is applied to the wire coil and current flows, the wire coil generates a magnetic field that attracts the piston and pulls the piston into the center of the wire coil. In some embodiments, the plunger 112 is structured such that when the solenoid 116 is energized, the force of installing of a genuine filter cartridge 102 is sufficient to cause the plunger 112 to retract and allow for correct installation. A method 800 of installation is described in greater detail below in FIG. 8.

Referring to FIG. 1B, a cross-sectional side view of the filtration system 100 of FIG. 1A in a second, assembled position is shown. When the filtration system 100 is in the assembled state, the filter cartridge 102 is positioned within a central compartment of the housing 104. Once the filter cartridge 102 is successfully installed into the housing 104, the solenoid 116 is no longer energized. Due to the presence of the filter cartridge 102, the plunger 112 is unable to move in a direction substantially perpendicular to the central axis of the central compartment. Generally, when the filtration system 100 is assembled, the filtration system 100 filters a fluid and provides the filtered fluid to a device, such as an internal combustion engine. The filtration system 100 receives fluids to be filtered through an inlet tube and into the housing 104. The filter blocking mechanism 106 is structured to ensure that the fluid entering the housing does not leak through the filter blocking mechanism 106. The fluid travels through the filter media 122 of the filter cartridge 102. Because the filter blocking mechanism 106 is retracted, the filter cartridge 102 is properly sealed within the housing 104. As the fluid passes through the filter media 122, the filter media 122 removes contaminants (e.g., dirt, dust, moisture, etc.) contained in the fluid.

Referring to FIG. 1C, a cross-sectional side view of the filtration system 100 of FIG. 1A in a third, assembled, de-energized position is shown. As shown in FIG. 1C, the solenoid 116 is no longer energized, and the filter cartridge 102 is successfully installed into the housing 104. Due to the presence of the filter cartridge 102, the plunger 112 is unable to move in a direction substantially perpendicular to the central axis of the central compartment. While FIGS. 1A-1C show the filter blocking mechanism 106 including a biasing member 114, in some embodiments the filter blocking mechanism 106 does not include a biasing member 114. In such embodiments, movement of the plunger 112 is caused by the current draw direction of the solenoid 116. The solenoid 116 is configured with a current draw in a first direction that causes the plunger 112 to extend and a current draw in a second, opposite, direction that causes the plunger 112 to retract. There is no current draw when the solenoid 116 is in the retracted or extended state.

In some embodiments, the filter blocking mechanism 106 of the filtration system 100 comprises a latching solenoid plunger. In contrast to a biased member-solenoid that may require constant energization to remain in a given state, a latching solenoid plunger remains in its last position when at a state of rest/de-energization. The latching solenoid plunger is structured to extend or retract a plunger 112 by reversing the direction of the current in a solenoid 116. In one embodiment, the latching solenoid plunger is energized on a periodic, time based occurrence. For example, the electronic identification sensor 108 may scan for an RFID tag 110 every ten seconds. If a genuine RFID tag 110 is located, a direct current (DC current) travels through the solenoid 116, retracting the plunger (regardless of the state of the latching solenoid plunger prior to energization). If a genuine RFID tag 110 is not present, a DC current travels through the solenoid 116 extending the plunger, regardless of what the state of the latching solenoid plunger was prior to energization. In some embodiments, a logic controller may be implemented in the filtration system 100. In these embodiments, the logic controller is able to determine the current state (e.g., retracted or extracted) of the latching solenoid plunger.

Figure 2:
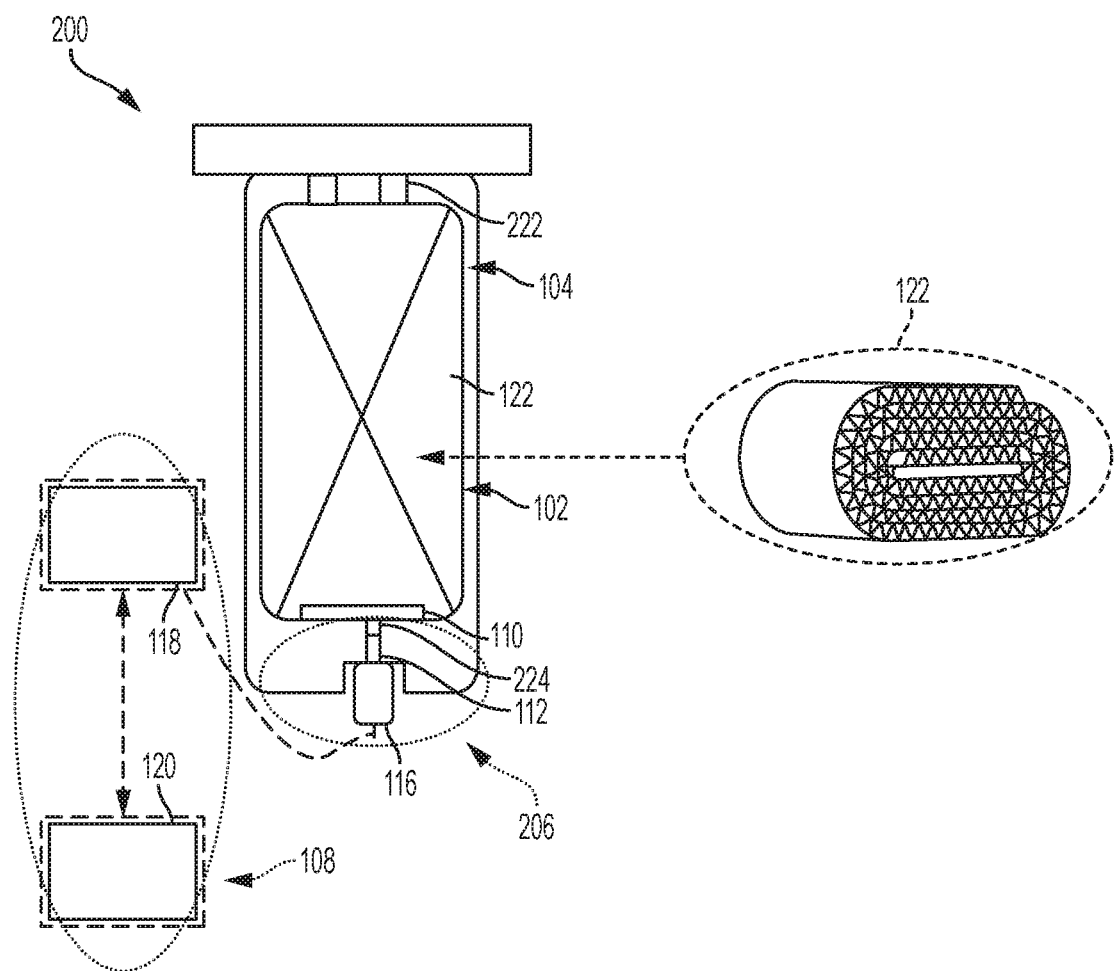
FIG. 2 shows a cross-sectional side view of a filtration system, according to another example embodiment.

Referring to FIG. 2, a cross-sectional side view of a filtration system 200 is shown, according to another example embodiment. The filtration system 200 is similar to the filtration system 100. A difference between the filtration system 200 and the filtration system 100 is the sealing of the filter cartridge 102 and the arrangement and composition of the filter blocking mechanism 206 of the filtration system 200. Accordingly, like numbering is used to designate like parts between the filtration system 200 and the filtration system 100. The filtration system 200 includes a filter cartridge 102, a housing 104, a vertical filter blocking mechanism 206, and an electronic identification sensor 108. As shown in FIG. 2, the filter cartridge 102 is in the process of being installed into the housing 104. The disposition of the filter blocking mechanism 206 on the end of the housing 104—instead of on the side of the housing 104 of the filtration system 100—allows for the filtration system 200 to accommodate height variation due to variability in the media slit width and other dimensions of the filter cartridge 102. As will be appreciated, upon detection of the installation of a genuine filter cartridge 102, the filter blocking mechanism 206 will actuate a plunger 112 to extend into contact with the filter cartridge 102, thereby pushing the filter cartridge 102 in the vertical direction and ensuring enough load for proper sealing of the filtration system 200.

The filter cartridge 102 includes the RFID tag 110 and filter media 122. The RFID tag 110 is recognizable by the electronic identification sensor 108 if the filter cartridge 102 is genuine and authorized for installation within the housing 104. As will be appreciated, the RFID tag 110 may be at or in any location on the filter cartridge 102 that is within the RFID range of the electronic identification sensor 108. The RFID tag 110 can include other identification mechanisms such as a QR code, a barcode, a serial number, a model number, a fleet number, or another feature that identifies the filter cartridge 102 as being genuine or authorized for installation into the housing 104.

The housing 104 includes a central compartment and the filter blocking mechanism 206. The central compartment is structured to receive the filter cartridge 102. Although the housing 104 is shown arranged as a cylindrical housing having a circular cross-sectional shape, the housing 104 can be arranged in other shapes to receive the filter cartridge 102. In some embodiments, the housing 104 includes a seal member 222 that is structured to form an inner seal with the filter cartridge 102. In other embodiments, the seal member 222 is disposed on the filter cartridge 102 and is structured to form an inner seal with the housing 104. In some embodiments, the filter blocking mechanism 206 is embedded within the housing 104 or formed as a part of the housing 104. In other embodiments, the filter blocking mechanism 206 is removably coupled to the housing 104.

The filter blocking mechanism 206 comprises a mechanical locking mechanism that is operably connected to the electronic identification sensor 108. The filter blocking mechanism 206 is similar to the filter blocking mechanism 106. Differences between the filter blocking mechanism 206 and the filter blocking mechanism 106 are the filter blocking mechanism 206 does not include a biasing member 114, is retracted at a rest position, and the plunger 112 extends in a direction that is substantially parallel to the central axis of the central cavity of the housing 104. As shown in FIG. 2, the filter blocking mechanism 206 includes a plunger 112, a solenoid 116, and a recess feature 224. The solenoid 116 comprises an electromechanically operated valve that is activated by an electric current that runs through the solenoid 116. The recess feature 224 is disposed in a first end of the housing 104 and is sized to the dimensions of the plunger 112 and the micron rating (e.g., the rating used to indicate the ability of a filter to remove contaminants by the size of the particles) of the genuine filter cartridges 102. The plunger 112 extends in a direction that is substantially parallel to the central axis of the central cavity of the housing 104 and along the recess feature 224. As shown in FIG. 2, the filter blocking mechanism 206 is in the first position (e.g., at rest). While in the first position, the plunger 112 is disposed in the recess feature 224 and the solenoid 116 has no current. The filter blocking mechanism 206 will extend only when the electronic identification sensor 108 identifies a genuine or authorized filter cartridge 102.

The electronic identification sensor 108 is operably connected to the filter blocking mechanism 206. The electronic identification sensor 108 includes an RFID reader 118 communicatively coupled to an RFID antenna 120. In some embodiments, the electronic identification sensor 108 is embedded within the housing 104 or formed as a part of the housing 104. In other embodiments, the electronic identification sensor 108 is removably coupled to the housing 104. In some embodiments, the electronic identification sensor 108 is disposed on an end of the housing 104 that is adjacent to location of the RFID tag 110 of a properly installed genuine filter cartridge 102. In other embodiments, the electronic identification sensor 108 is located within the filtration system 200 but is not attached to the housing 104 or filter cartridge 102. As will be appreciated, the electronic identification sensor 108 is generally located at a location on the housing 104 that is within the range to detect an RFID tag 110 on a genuine filter cartridge 102 being installed into the central compartment of the housing 104.

The RFID reader 118 comprises an RFID receiver or transceiver that is structured to read identification data contained on the RFID tag 110 of the filter cartridge. The identification data includes at least a serial number or unique code associated with the filter cartridge 102 that is trying to be installed. The serial number or unique code indicates whether the filter cartridge 102 is genuine or authorized. The RFID reader 118 includes a RFID antenna 120 that communicates with the RFID tag 110 by sending and receiving signals. The RFID antenna 120 is structured to communicate within an RFID range to detect an RFID tag 110 on a genuine filter cartridge 102 as the filter cartridge 102 is attempting to be installed. In some embodiments, the RFID range is sufficient to allow for the RFID reader 118 to detect the RFID tag 110 upon installation of the filter cartridge 102 into the housing 104, thereby causing the filter blocking mechanism 206 to extend and seal the filter cartridge 102 and housing 104. In some arrangements, the RFID reader 118 includes a processor communicably coupled to the RFID reader 118 and RFID antenna 120. The processor is structured to interrogate RFID tags embedded in filtration cartridges installed in a monitored filtration system to determine if the installed filtration cartridge is genuine.

As shown in FIG. 2, the genuine filter cartridge 102 is disposed in the central compartment and disposed in the housing 104. At this state, the RFID reader 118 has not queried the RFID tag 110 on the filter cartridge 102, so the filter blocking mechanism 206 is not activated and in the first position. In the first position, the solenoid 116 is not activated and the plunger 112 is not extended. While the filter cartridge 102 is able to be disposed in the housing 104, a proper inner seal is not formed between the filter cartridge 102 and the seal member 222 and therefore the installation is not complete (e.g., running the filtration system 200 would cause leaks, improper filtration, etc.).

As will be appreciated, once the filter cartridge 102 is disposed in the housing 104, the RFID reader 118 will query the RFID tag 110 to determine if the RFID tag 110 is associated with a genuine or authorized filter cartridge 102. In some embodiments, the tip of the plunger 112 is disposed at the edge of the recess feature 224 and the RFID reader 118 will query the RFID tag 110 when the tip of the plunger 112 comes in contact with the filter cartridge 102. Upon a determination that the filter cartridge 102 is authorized, the electronic identification sensor 108 causes the solenoid 116 of the filter blocking mechanism 206 to become energized. The energized solenoid 116 causes the plunger 112 to move through the recess feature 224 towards the filter cartridge 102 in a direction that is substantially parallel to the central axis of the central cavity of the housing 104. The extending plunger 112 pushes upon an end of the filter cartridge 102 causing the filter cartridge 102 to press against the seal member 222. The plunger 112 is structured to extend and cause a load that is sufficient to form an inner seal between the seal member 222 and the filter cartridge 102. In some embodiments, the filter blocking mechanism 206 is structured to establish a longer sealing life by compensating for compression set over the lifecycle of the filter cartridge 102.

Figure 3:
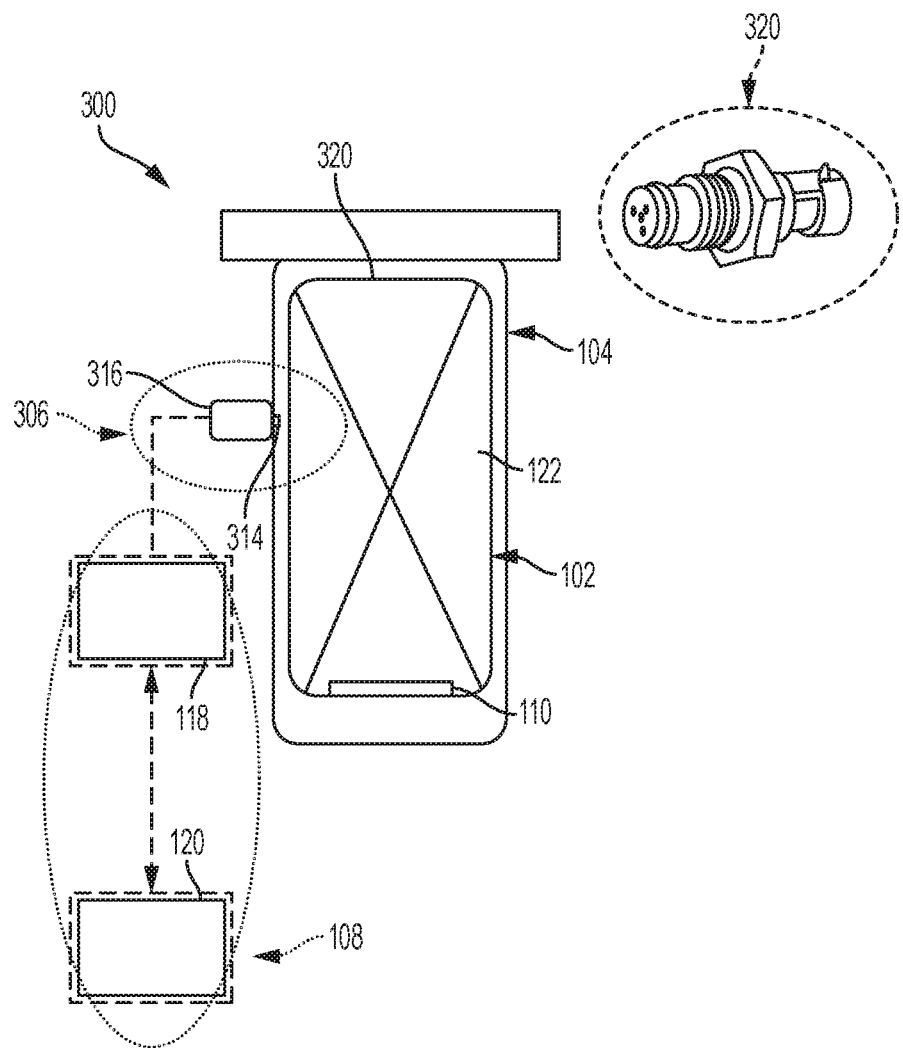
FIG. 3 shows a cross-sectional side view of a filtration system, according to another example embodiment.

Referring to FIG. 3, a cross-sectional side view of a filtration system 300 is shown, according to another example embodiment. The filtration system 300 is similar to the filtration system 100. A difference between the filtration system 300 and the filtration system 100 is the use of a fluid valve on the pressure side as the filter blocking mechanism 306 of the filtration system 300. Accordingly, like numbering is used to designate like parts between the filtration system 300 and the filtration system 100. The filtration system 300 includes a filter cartridge 102, a housing 104, a filter blocking mechanism 306, and an electronic identification sensor 108. As shown in FIG. 3, the filter cartridge 102 is installed into the housing 104. The filtration system 300 is in a first position that includes the filter blocking mechanism 306 at rest. As will be appreciated, in the first position, a fluid valve 314 of the filter blocking mechanism 306 is closed and prevents any fluid from flowing into the filter cartridge 102. The fluid valve 314 of the filter blocking mechanism 306 will open only when a flow pressure is detected and the electronic identification sensor 108 identifies a genuine or authorized filter cartridge 102.

The filter cartridge 102 of the filtration system 300 includes the RFID tag 110 and filter media 122. The RFID tag 110 is recognizable by the electronic identification sensor 108 if the filter cartridge 102 is genuine and authorized for installation within the housing 104. As will be appreciated, the RFID tag 110 may be at or in any location on the filter cartridge 102 that is within the RFID range of the electronic identification sensor 108. The RFID tag 110 can include other identification mechanisms such as a QR code, a barcode, a serial number, a model number, a fleet number, or another feature that identifies the filter cartridge 102 as being genuine or authorized for installation into the housing 104.

The housing 104 of the filtration system 300 includes a central compartment, a pressure sensor 320, and the filter blocking mechanism 306. The central compartment is structured to receive the filter cartridge 102. Although the housing 104 is shown arranged as a cylindrical housing having a circular cross-sectional shape, the housing 104 can be arranged in other shapes to receive the filter cartridge 102. The pressure sensor 320 is communicatively coupled to the electronic identification sensor 108 or, in some embodiments, an Engine Control Module ("ECM") to communicate that a fluid is flowing in the housing 104. In some embodiments, the pressure sensors 320 are integrated pressure differential ("dP") sensors. While the pressure sensor 320 is show at the top of the housing 104, the pressure sensor 320 may be in a wide variety of locations along the filtration system 300 to communicate that a fluid is flowing in the housing 104. In some embodiments, the filter blocking mechanism 306 is embedded within the housing 104 or formed as a part of the housing 104. In other embodiments, the filter blocking mechanism 306 is removably coupled to the housing 104.

The filter blocking mechanism 306 comprises a mechanical locking mechanism that is operably connected to the electronic identification sensor 108. The filter blocking mechanism 306 is similar to the filter blocking mechanism 106. Differences between the filter blocking mechanism 306 and the filter blocking mechanism 106 include the point that the filter blocking mechanism 306 does not include a biasing member or plunger, instead utilizing a fluid valve 314 that is closed at a first position and open at a second position. The filter blocking mechanism 306 is structured to activate (e.g., open) upon detection of a fluid flow by the pressure sensor 320 and of a genuine filter cartridge 102. If no genuine filter cartridge 102 is detected, the filter blocking mechanism 306 will remain at a first position (e.g., a rest position), and the fluid valve 314 will remain closed.

As shown in FIG. 3, the filter blocking mechanism 306 includes a solenoid 116 and a fluid valve 314. The solenoid 116 comprises an electromechanically operated valve that is activated by an electric current that runs through the solenoid 116. The fluid valve 314 is disposed on the pressure side of the filtration system 300 near the inlet of the filter cartridge 102. In the first position (e.g., at rest), the fluid valve 314 is closed and the solenoid 116 has no current. The filter blocking mechanism 306 will activate and the fluid valve 314 will open only when the electronic identification sensor 108 receives a flow identifier from the pressure sensor 320 and, subsequently, identifies a genuine or authorized filter cartridge 102.

The electronic identification sensor 108 is operably connected to the filter blocking mechanism 306. The electronic identification sensor 108 includes an RFID reader 118 communicatively coupled to an RFID antenna 120. In some embodiments, the electronic identification sensor 108 is embedded within the housing 104 or formed as a part of the housing 104. In other embodiments, the electronic identification sensor 108 is removably coupled to the housing 104. In some embodiments, the electronic identification sensor 108 is disposed on an end of the housing 104 that is adjacent to location of the RFID tag 110 of a properly installed genuine filter cartridge 102. In other embodiments, the electronic identification sensor 108 is located within the filtration system 300 but is not attached to the housing 104 or filter cartridge 102. As will be appreciated, the electronic identification sensor 108 is generally located at a location on the housing 104 that is within the range to detect an RFID tag 110 on a genuine filter cartridge 102 being installed into the central compartment of the housing 104.

The RFID reader 118 comprises an RFID receiver or transceiver that is structured to read identification data contained on the RFID tag 110 of the filter cartridge. The identification data includes at least a serial number or unique code associated with the filter cartridge 102 that is trying to be installed. The serial number or unique code indicates whether the filter cartridge 102 is genuine or authorized. The RFID reader 118 includes a RFID antenna 120 that communicates with the RFID tag 110 by sending and receiving signals. The RFID antenna 120 is structured to communicate within an RFID range to detect an RFID tag 110 on a genuine filter cartridge 102 as the filter cartridge 102 is attempting to be installed. In some embodiments, the RFID range is sufficient to allow for the RFID reader 118 to detect the RFID tag 110 upon receiving a flow identifier from the pressure sensor 320. In some arrangements, the RFID reader 118 includes a processor communicably coupled to the RFID reader 118 and RFID antenna 120. The processor is structured to receive a flow identifier from the pressure sensor 320 that triggers an interrogation into the RFID tags embedded in filtration cartridges installed in a monitored filtration system to determine if the installed filtration cartridge is genuine.

As shown in FIG. 3, the genuine filter cartridge 102 is disposed in the central compartment and installed into the housing 104. The solenoid 116 is not activated and, therefore, the fluid valve 314 is closed and prevents fluid flow from the housing 104 to enter the inlet of the filter cartridge 102. Once a fluid flow travels through the housing 104, the pressure sensor 320 is triggered and the flow identifier is transmitted to the electronic identification sensor 108. The electronic identification sensor 108, by way of the RFID reader 118, determines if the RFID tag 110 is associated with a genuine or authorized filter cartridge 102. Once determined to be genuine and authorized, the electronic identification sensor 108 causes the solenoid 116 of the filter blocking mechanism 306 to become energized, thereby causing the fluid valve 314 to open. The open fluid valve 314 allows for the fluid to travel from the housing 104 into the filter cartridge 102. In some embodiments, the solenoid 116 is not needed to activate the fluid valve 314.

Referring to FIG. 4A, a cross-sectional side view of a filtration system 400 in a first position is shown, according to another example embodiment. The filtration system 400 is similar to the filtration system 100. A difference between the filtration system 400 and the filtration system 100 is the filter blocking mechanism 406 of the filtration system 400. Accordingly, like numbering is used to designate like parts between the filtration system 400 and the filtration system 100. The filtration system 400 includes a filter cartridge 102, a housing 104, a filter blocking mechanism 406, and an electronic identification sensor 108. As shown in FIG. 4A, the filter cartridge 102 is in the process of being installed into the housing 104. The filtration system 400 is in a first position that includes the filter blocking mechanism 406 at rest. As will be appreciated, in the first position, the filter blocking mechanism 406 is extended and prevents the installation of any filter cartridge 102. The filter blocking mechanism 406 will retract only when the electronic identification sensor 108 identifies a genuine or authorized filter cartridge 102.

The filter cartridge 102 includes an RFID tag 110 and filter media 122. The RFID tag 110 is recognizable by the electronic identification sensor 108 if the filter cartridge 102 is genuine and authorized for installation within the housing 104. The RFID tag 110 may be a passive (e.g., requires no internal power source) or an active (e.g., require an internal power source) RFID tag 110. In some arrangements, the RFID tag 110 is annular and substantially surrounds or encompasses an end of the filter cartridge 102. In other embodiments, the RFID tag 110 is disposed within the filter cartridge 102 and within an RFID range. In one embodiment, the passive RFID transponder is embedded within the filter cartridge 102 or formed as a part of the filter cartridge 102. As will be appreciated, the RFID tag 110 may be located anywhere on the filter cartridge 102 that is within the RFID range of the electronic identification sensor 108. The RFID tag 110 can include other identification mechanisms such as a QR code, a barcode, a serial number, a model number, a fleet number, or another feature that identifies the filter cartridge 102 as being genuine or authorized for installation into the housing 104.

The housing 104 includes a central compartment and the filter blocking mechanism 406. The central compartment is structured to receive the filter cartridge 102. Although the housing 104 is shown arranged as a cylindrical housing having a circular cross-sectional shape, the housing 104 can be arranged in other shapes to receive the filter cartridge 102.

The filter blocking mechanism 406 comprises a mechanical locking mechanism that is operably connected to the electronic identification sensor 108 and a control button 414. The filter blocking mechanism 406 includes a solenoid 116 and a plurality of push rods 412. The solenoid 116 comprises an electromechanically operated valve that is activated by an electric current that runs through the solenoid 116. The plurality of push rods 412 are moved (e.g., retracted and extended) by the solenoid 116. In some embodiments, the plurality of push rods 412 may be a single push rod 412. The filter blocking mechanism 406 is structured to block installation of a filter cartridge into the central compartment of the housing 104 until a genuine filter cartridge 102 is detected by the electronic identification sensor 108. If the central compartment of the housing 104 is empty or if no genuine RFID tag 110 is sensed by the electronic identification sensor 108, then the filter blocking mechanism 406 will extend the plurality of push rods 412 to a blocking position and prevent installation. As will be appreciated, when a genuine RFID tag 110 is identified, the filter blocking mechanism 406 will retract the plurality of push rods 412 to allow for installation.

In some embodiments, the filter blocking mechanism 406 is embedded within the housing 104 or formed as a part of the housing 104. In other embodiments, the filter blocking mechanism 406 is removably coupled to the housing 104. In some embodiments, the filter blocking mechanism 406 further includes a locking gasket that has holes that align with the plurality of push rods 412 and seal off when the plurality of push rods 412 are proper aligned.

The locking gasket, for example, can be similar to the locking gasket 710 described below, in greater detail, in FIG. 7. As shown in FIG. 4A, when the solenoid 116 is at rest, and has no current, the plurality of push rods 412 extend in a direction that is substantially parallel to the central axis of the central cavity of the housing 104. The plurality of push rods 412 are unable to move in the first position, thereby preventing installation of any filter cartridge 102.

The electronic identification sensor 108 is operably connected to the filter blocking mechanism 106. The electronic identification sensor 108 includes an RFID reader 118 communicatively coupled to an RFID antenna 120. In some embodiments, the electronic identification sensor 108 is embedded within the housing 104 or formed as a part of the housing 104. In other embodiments, the electronic identification sensor 108 is removably coupled to the housing 104. In some embodiments, the electronic identification sensor 108 is disposed on an end of the housing 104 that is adjacent to location of the RFID tag 110 of a properly installed genuine filter cartridge 102. In other embodiments, the electronic identification sensor 108 is located within the filtration system 400 but is not attached to the housing 104 or filter cartridge 102. As will be appreciated, the electronic identification sensor 108 is generally located at a location on the housing 104 that is within the range to detect an RFID tag 110 on a genuine filter cartridge 102 being installed into the central compartment of the housing 104.

The RFID reader 118 comprises an RFID receiver or transceiver that is structured to read identification data contained on the RFID tag 110 of the filter cartridge. The identification data includes at least a serial number or unique code associated with the filter cartridge 102 that is trying to be installed. The serial number or unique code indicates whether the filter cartridge 102 is genuine or authorized. The RFID reader 118 includes a RFID antenna 120 that communicates with the RFID tag 110 by sending and receiving signals. The RFID antenna 120 is structured to communicate within an RFID range to detect an RFID tag 110 on a genuine filter cartridge 102 as the filter cartridge 102 is attempting to be installed. In some embodiments, the RFID range is sufficient to allow for the RFID reader 118 to detect the RFID tag 110—thereby causing the filter blocking mechanism 406 to retract—before the genuine filter cartridge 102 comes in contact with the plurality of push rods 412. In some arrangements, the RFID reader 118 includes a processor communicably coupled to the RFID reader 118 and RFID antenna 120. The processor is structured to interrogate RFID tags embedded in filtration cartridges installed in a monitored filtration system to determine if the installed filtration cartridge is genuine.

As shown in FIG. 4A, the genuine filter cartridge 102 is in the process of being installed into the housing 104. The RFID reader 118 transmits a query via the RFID antenna 120 within the RFID range. The RFID tag 110 is within the RFID range and receives the query, sending identification data back to the RFID reader 118 in response. The RFID reader 118 determines that the RFID tag 110 is associated with a genuine or authorized filter cartridge 102. The electronic identification sensor 108 causes the solenoid 116 of the filter blocking mechanism 406 to become energized. When the solenoid 116 is energized, the plurality of push rods 412 are able to move and are retracted, thereby allowing the installation of the filter cartridge 102 to be unobstructed as it is fully disposed in the central compartment of the housing 104, as shown in FIG. 4B. In some embodiments, the plurality of push rods 412 are structured such that when the solenoid 116 is energized, the force of installing of a genuine filter cartridge 102 is sufficient to cause the plurality of push rods 412 to retract and allow for correct installation.

Referring to FIG. 4B, a cross-sectional side view of the filtration system 400 of FIG. 4A in a second, assembled position is shown. When the filtration system 400 is in the assembled state, the filter cartridge 102 is positioned within a central compartment of the housing 104. Once the filter cartridge 102 is successfully installed into the housing 104, the solenoid 116 is no longer energized and the plurality of push rods 412 remain in the retracted position. As will be appreciated, the plurality of push rods 412 only move (e.g., extend or retract) when acted upon by the solenoid 116. A difference between the filtration system 400 and the filtration system 100 is the filtration system 400 includes a control button 414 or other actuator that assists in the removal of the filter cartridge 102. The control button 414 facilitates the removal of the filter cartridge 102 by allowing a user to cause the plurality of push rods 412 to extend. As will be appreciated, when a user (e.g., OEM, mechanic, etc.) pushes the control button 414, the solenoid 116 is activated and the plurality of push rods 412 extend to push the filter cartridge 102 free from the housing 104. Upon release of the control button 414, the RFID tag 110 is still in range of the electronic identification sensor 108 causing the plurality of push rods 412 to retract. When the genuine filter cartridge 102 is removed, the RFID tag 110 is outside the range of the electronic identification sensor 108 causing the plurality of push rods 412 to extend and prevent installation. Subsequently, detection by the electronic identification sensor 108 of a genuine or authorized filter cartridge 102, will cause the solenoid 116 to energize and retract the plurality of push rods 412 to allow for filter cartridge installation.

Figure 5:
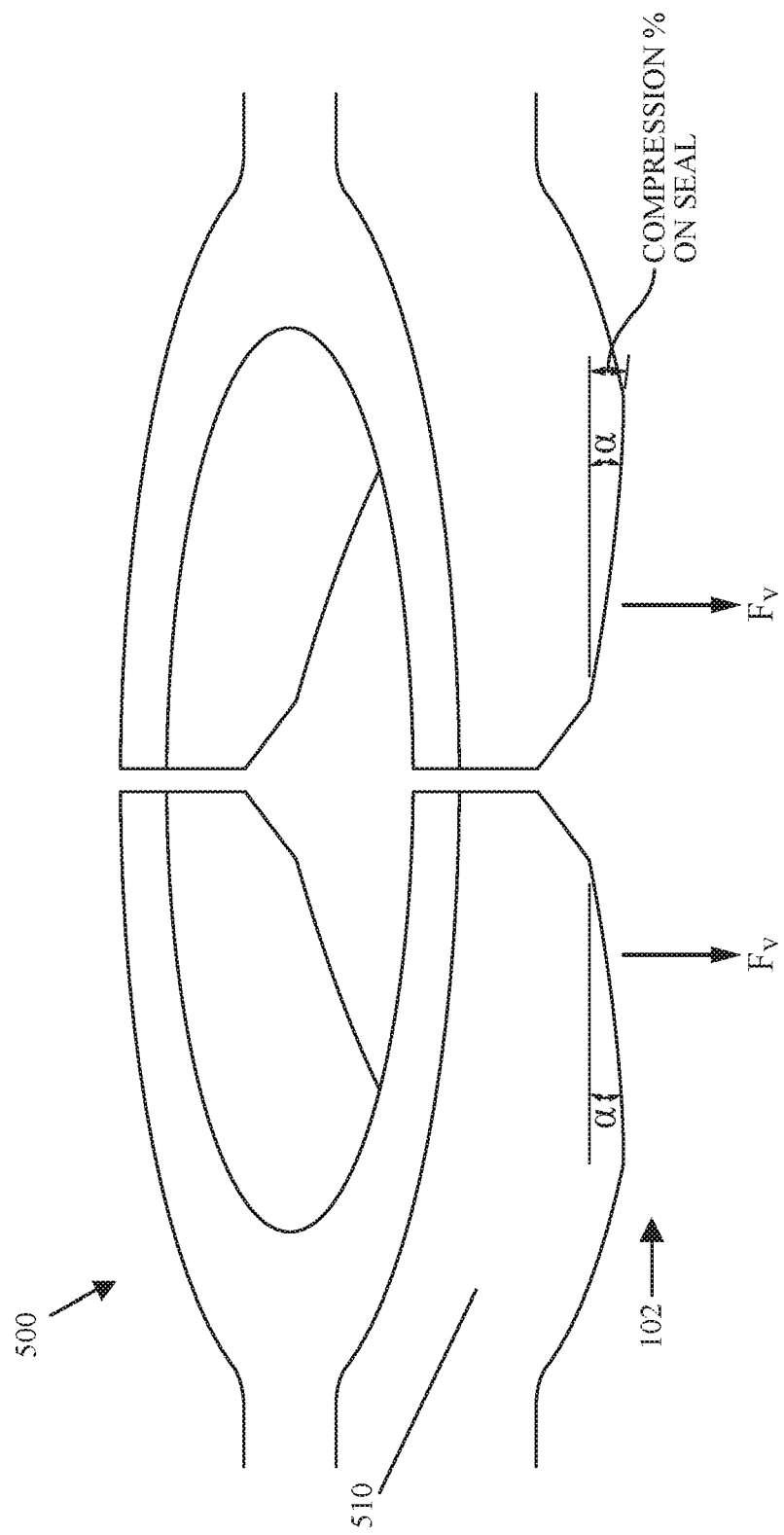
FIG. 5 shows a perspective view of a wedge block feature of a filtration system, according to an example embodiment.

Referring to FIG. 5, a perspective view of a wedge block feature 510 of a filtration system 500 is shown, according to an example embodiment. As used herein, the term "wedge block" includes an inclined plane with the necessary travel distance and sufficient force on an angle to compress a seal in datum seal plane. The filtration system 500 is similar to the filtration system 100. A difference between the filtration system 500 and the filtration system 100 is that the electronic identification sensor 108 identifies an authorized or genuine filter cartridge 102 and drives a wedge block feature 510 to provide seal compression for the filtration system 500. Accordingly, like numbering is used to designate like parts between the filtration system 500 and the filtration system 100. The filtration system 500 includes a filter cartridge 102, a housing 104, a wedge block feature 510, and an electronic identification sensor 108. As shown in FIG. 5, when a genuine filter cartridge 102 is installed into the housing 104, a wedge block feature 510 is driven to exert a load on the filter cartridge 102 to ensure a proper seal is formed between the filter cartridge 102 and housing 104 or wedge block feature 510 of the filtration system 500. In particular embodiments, the wedge block feature 510 comprises a cam lock around an end of the filter cartridge 102 to form a seal compression.

Figure 6:
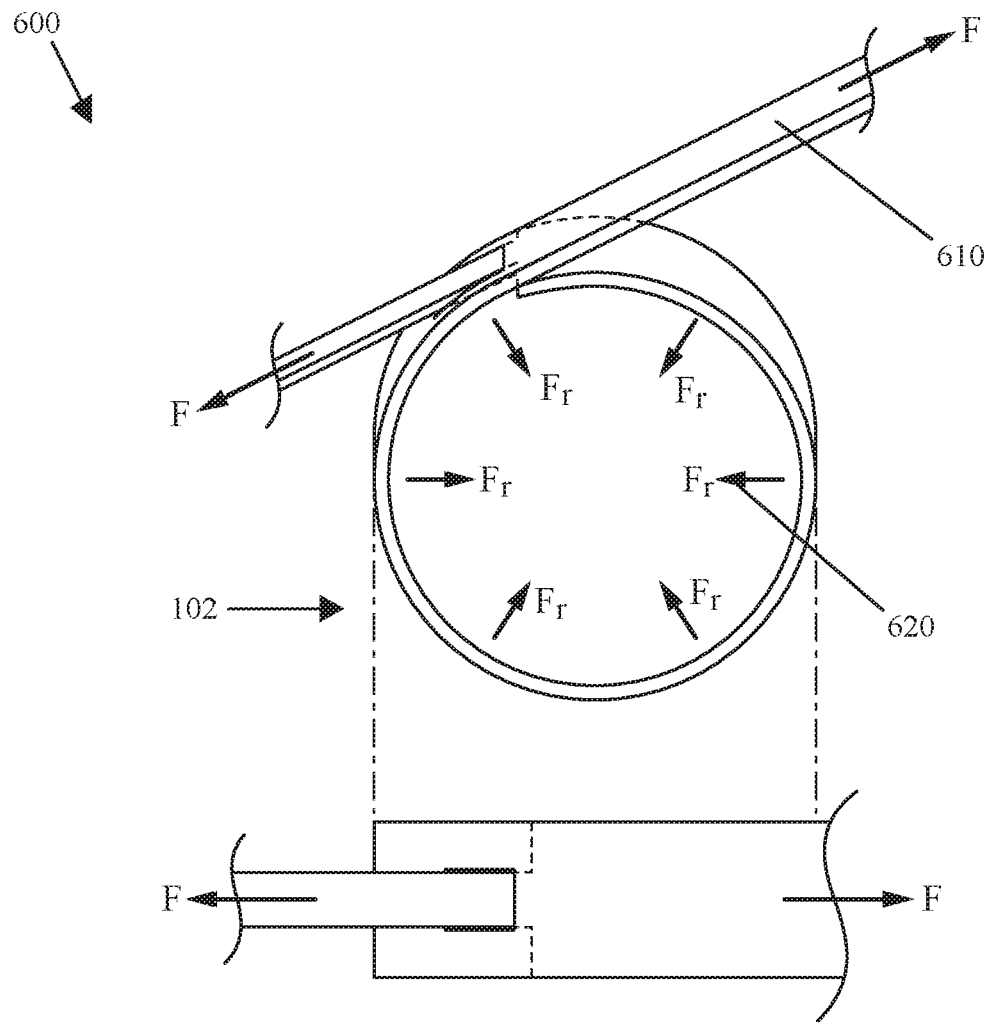
FIG. 6 shows a pair of perspective views of a cinch mechanism of a filtration system, according to another example embodiment.

Referring to FIG. 6, a pair of perspective views of a cinch mechanism 610 of a filtration system 600 are shown, according to an example embodiment. The filtration system 600 is similar to the filtration system 100. A difference between the filtration system 600 and the filtration system 100 is that the electronic identification sensor 108 identifies an authorized or genuine filter cartridge 102 and drives a cinch (e.g., pull) mechanism 610 to provide seal compression for the filtration system 600. Accordingly, like numbering is used to designate like parts between the filtration system 600 and the filtration system 100. The filtration system 600 includes a filter cartridge 102, a housing 104, a cinch mechanism 610, and an electronic identification sensor 108. As shown in FIG. 6, when a genuine filter cartridge 102 is installed into the housing 104, a cinch mechanism 610 is driven to exert a load on the filter cartridge 102 to ensure a proper seal is formed between the filter cartridge 102 and housing 104 or cinch mechanism 610 of the filtration system 600. In some embodiments, the cinch mechanism 610 is a pull lock around an end of the filter cartridge 102 such that a radial seal 620 is formed between the filter cartridge 102 and the cinch mechanism 610.

Figure 7:
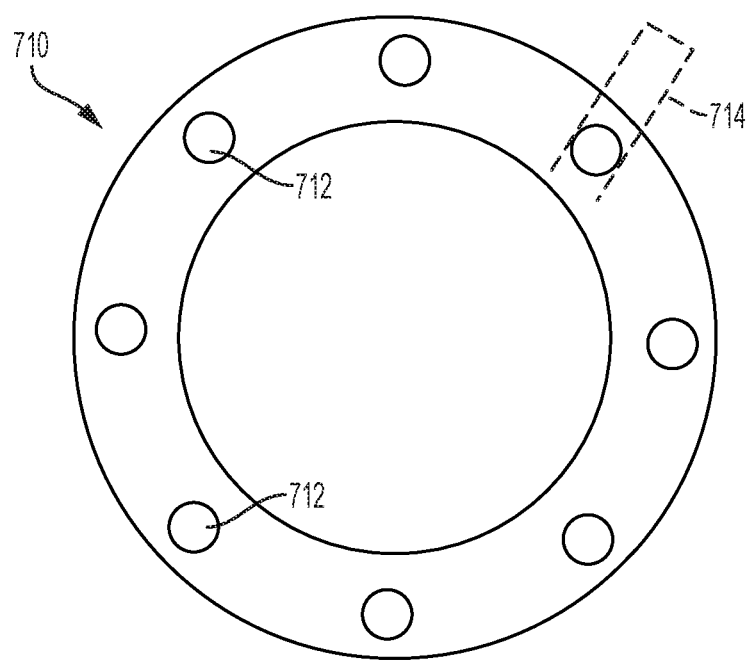
FIG. 7 shows a perspective view of a locking gasket for a filtration system, according to an example embodiment.

Referring to FIG. 7, a perspective view of a locking gasket 710 for a filtration system, according to an example embodiment. The locking gasket 710 can be used in any of the filtration systems 100, 200, 300, 400, 500, 600 to an unlockable mechanism. The locking gasket 710 includes a plurality of holes 712 and a pin 714. The locking gasket can be disposed on a filter cartridge 102, a housing 104 or at an interface of the filter cartridge 102 and housing 104. In some embodiments, the interface between the filter cartridge 102 and housing 104 may comprise a screw thread, snap feature, or otherwise joint feature to prevent a "back off" or other filter disengagement from occurring. As will be appreciated, this filter retaining function beneficially accommodates variation in the filter cartridge 102 manufacturing processes. The locking gasket 710 is lockable and unlockable only by an authorized entity or certified user (e.g., an OEM, a dealer, a mechanic, etc.) that has the appropriate key. The pin 714 prevents the housing 104 from being opened and is not visible from the outside. The pin 714 is retractable to allow the filtration system to seal. In some embodiments, a message may be disposed on the housing 104 informing a user that the housing 104 is able to be opened and/or service by the authorized entity. The locking gasket 710 ensures that a proper filter cartridge 102 will be installed.

Figure 8:
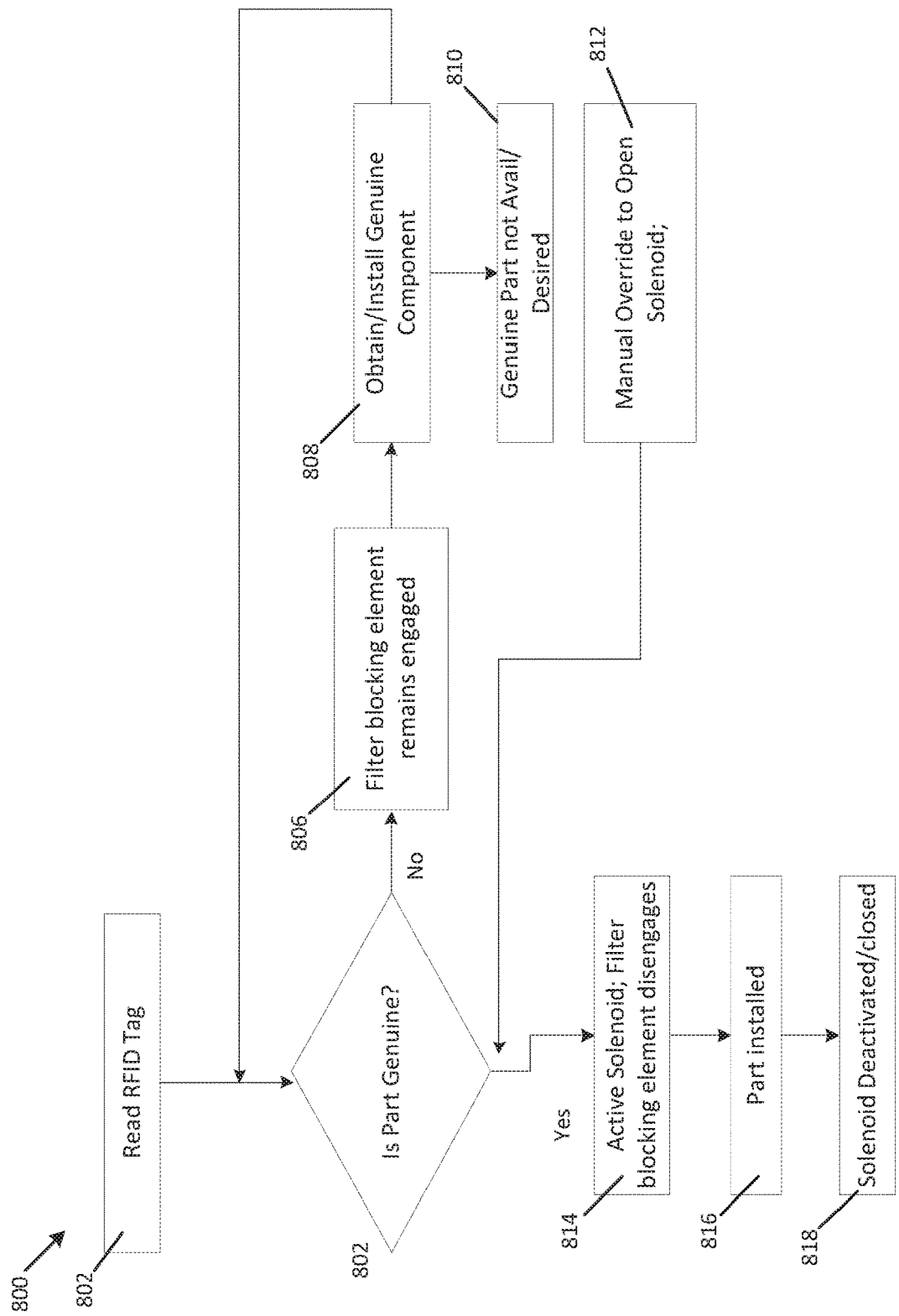
FIG. 8 is a flow diagram of a method of installing a filter cartridge in a housing, according to an example embodiment.

Referring to FIG. 8, a flow diagram of a method 800 of installing a filter cartridge in a housing is shown, according to an example embodiment. The method 800 may be used in conjunction with any of the filtration systems 100, 200, 300, 400, 500, 600, for example the filtration system 100 of FIGS. 1A and 1B. At the beginning of the method 800 the filter blocking mechanism 106 is in a blocking or closed positon and prevents the installation or use (e.g., blocking fluid flow) of the filter cartridge 102 in the housing 104.

The method 800 begins at 802 when the RFID tag 110 of the filter cartridge 102 is in RFID range of the electronic identification sensor 108. The RFID reader 118 transmits a query via the RFID antenna 120 within the RFID range. In some embodiments, the transmission may be an continuous query (e.g., every ten minutes). In other embodiments, the query is triggered by an event (e.g., the housing being opened, an empty central compartment, etc.). The RFID tag 110 is within the RFID range and receives the query, and sends identification data (e.g., a serial number, a filter identifier, a filter manufacturing date, an identification element code, etc.) back to the RFID reader 118 in response.

At 804, the RFID reader 118 receives the identification data and determines if the identification data corresponds to a genuine or authorized filter cartridge 102. In some embodiments, the RFID reader 118 may include a processing circuit having a processor (e.g., a general-purpose processor, an application specific integrated circuit (ASIC), one or more field programmable gate arrays (FPGAs), a digital signal processor (DSP), a group of processing components, or other suitable electronic processing components) and memory (e.g., RAM, NVRAM, ROM, Flash Memory, hard disk storage, etc.), an analog to digital converter circuit, and various communication interfaces (e.g., analog sensor inputs, digital sensor inputs, coaxial RFID antenna inputs, J1939 datalink communication input/output, Bluetooth transceiver, etc.). The RFID reader 118 verifies installed filter cartridges as being genuine (i.e., authentic or OEM approved) based on a filter ID stored in an RFID tag of a given filter cartridge. For example, the RFID reader 118 determines whether the installed filter cartridge 102 is genuine based on analyzing returned data (or absence thereof) and comparing the returned data to expected data. If no data or unexpected data is received from the installed filter cartridge, the RFID reader 118 determines that no filter or an unauthorized filter is installed in the filtration system.

At 806, the RFID reader 118 determines that filter cartridge is not genuine, and the filter blocking mechanism 106 remains in a blocking position (e.g., extended, closed, rigidly positioned, etc.). Accordingly, the filter cartridge 102 is unable to be installed into the housing 104. At 808, a different and genuine filter cartridge 102 is required to allow for proper installation into the housing 104. If no genuine filter cartridge is acquired, the method 800 fails at 810 and no filter cartridge 102 in installed into the housing 104.

At 814, a genuine filter cartridge 102 is detected by the RFID reader 118, causing the solenoid 116 to become energized. The energized solenoid 116 causes the blocking element (e.g., plunger 112, fluid valve 314, plurality of push rods 412, etc.) to retract or open to allow for installation of the genuine filter cartridge 102.

At 816, the filter cartridge 102 is installed into the housing 104. In some embodiments, additional feature may be installed. For example, the locking gasket 710 of FIG. 7.

At 818, the filter cartridge 102 is successfully installed into the housing 104, causing the solenoid 116 to deactivate (e.g., no longer energized). In some embodiments, due to the presence of the filter cartridge 102, the blocking element is unable to move in a direction substantially towards the filter cartridge 102. In other embodiments, the blocking element is only able to move (e.g., retract and extend) when the solenoid 116 is active. Generally, when the filtration system 100 is assembled, the filtration system 100 filters a fluid and provides the filtered fluid to a device, such as an internal combustion engine.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains.

It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

The computer readable program code (e.g., identification code) embodied on a processing circuit may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

What is claimed is:

1. A filtration system comprising:
   a housing comprising a central compartment;
   a filter cartridge positioned within the central compartment, the filter cartridge comprising filter media and an identification element;
   an electronic identification sensor structured to sense the identification element; and
   a wedge block feature communicably coupled to the electronic identification sensor;
   wherein:
      the electronic identification sensor is configured to identify whether the filter cartridge is an authorized filter cartridge based on the identification element, and
      the wedge block feature is driven to provide seal compression for the filtration system in response to the electronic identification sensor detecting that the filter cartridge is an authorized filter cartridge.

2. The filtration system of claim 1, wherein the wedge block feature is driven to exert a load on the filter cartridge to ensure a proper seal is formed between the filter cartridge and one of the housing and the wedge block feature in response to the electronic identification sensor detecting that the filter cartridge is an authorized filter cartridge.

3. The filtration system of claim 1, wherein the wedge block feature further comprises an inclined plane with the necessary travel distance and sufficient force on an angle to compress a seal in datum seal plane.

4. The filtration system of claim 1, wherein the wedge block feature comprises a cam lock positioned around an end of the filter cartridge to form the seal compression.

5. The filtration system of claim 1, wherein the wedge block feature comprises:
   a first wedge block having a first semi-circular body that extends into the central compartment in a first direction;
   a second wedge block having a second semi-circular body that extends into the central compartment in a second direction;
   wherein the first direction and the second direction and substantially opposite.

6. A filtration system comprising:
   a housing comprising a central compartment;
   a filter cartridge positioned within the central compartment, the filter cartridge comprising filter media and an identification element;

an electronic identification sensor structured to sense the identification element; and a cinch mechanism communicably coupled to the electronic identification sensor;

wherein:

the electronic identification sensor is configured to identify whether the filter cartridge is an authorized filter cartridge based on the identification element, and the cinch mechanism is driven to provide seal compression for the filtration system in response to the electronic identification sensor detecting that the filter cartridge is an authorized filter cartridge.

7. The filtration system of claim 6, wherein the cinch mechanism is driven to exert a load on the filter cartridge to ensure a proper seal is formed between the filter cartridge and one of the housing and the cinch mechanism in response to the electronic identification sensor detecting that the filter cartridge is an authorized filter cartridge.

8. The filtration system of claim 6, wherein the cinch mechanism comprises a pull lock that is positioned around an end of the filter cartridge such that a radial seal is formed between the filter cartridge and the cinch mechanism.

9. The filtration system of claim 6, wherein the cinch mechanism comprises:

a first end portion extending in a first direction, the first end portion defining an opening; and a second end portion extending through the opening in a second direction substantially opposite to the first direction.

10. The filtration system of claim 9, wherein the cinch mechanism is driven by applying a first force to the first end portion in the first direction and applying a second force to the second end portion in the second direction such that a diameter of the cinch mechanism decreases and the cinch mechanism applies an inward radial force to the filter cartridge.

11. A housing having a central compartment configured to receive a filter element with an identification element, the housing comprising:

an electronic identification sensor structured to sense the identification element of the filter element; and a filter engagement mechanism communicably coupled to the electronic identification sensor, the filter engagement mechanism comprising a first position and a second position, wherein:

in the first position the filter engagement mechanism allows the filter element to be disposed within the housing, and in the second position, the filter engagement mechanism engages the filter element to form a seal between the filter element and at least one of the housing and the filter engagement mechanism, thereby preventing fluid from bypassing the filter element wherein the filter engagement mechanism transitions from the first position to the second position in response to filter element information of the identification element sensed by the electronic identification sensor is identified as corresponding to an authorized filter element.

12. The housing of claim 11, wherein the filter engagement mechanism is a wedge block feature that is driven radially inward toward an axis of the housing to engage and exert a load on the filter element to provide seal compression in response to the electronic identification sensor detecting that the filter element is an authorized filter element.

13. The housing of claim 12, wherein the wedge block feature further comprises an inclined plane with the necessary travel distance and sufficient force on an angle to compress a seal in datum seal plane.

14. The housing of claim 11, wherein the filter engagement mechanism comprises a cinch mechanism driven to exert a radial load on the filter element to ensure a proper seal is formed in response to the electronic identification sensor detecting that the filter element is an authorized filter element.

15. The housing of claim 14, wherein the cinch mechanism comprises a pull lock that is positioned around an end of the filter element such that a radial seal is formed between the filter element and the cinch mechanism when the cinch mechanism is driven to exert the radial load on the filter element.

16. The housing of claim 14, wherein the cinch mechanism comprises:

a first end portion extending in a first direction, the first end portion defining an opening; and a second end portion extending through the opening in a second direction substantially opposite to the first direction.

17. The housing of claim 16, wherein the cinch mechanism is driven by applying a first force to the first end portion in the first direction and applying a second force to the second end portion in the second direction such that a diameter of the cinch mechanism decreases and the cinch mechanism applies an inward radial force to the filter element.

18. The housing of claim 11, wherein the filter engagement mechanism extends in a direction that is substantially perpendicular to a central axis of the central compartment of the housing.

* * * * *